US006243056B1

(12) United States Patent
Jachimowicz et al.

(10) Patent No.: US 6,243,056 B1
(45) Date of Patent: Jun. 5, 2001

(54) TRANSCEIVER WITH MINIATURE VIRTUAL IMAGE DISPLAY

(75) Inventors: Karen E. Jachimowicz, Laveen; Michael S. Lebby, Apache Junction, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/350,777

(22) Filed: Dec. 7, 1994

Related U.S. Application Data

(63) Continuation-in-part of application No. 08/130,825, filed on Oct. 4, 1993, now abandoned.

(51) Int. Cl.$^7$ ........................................................ G09G 3/32
(52) U.S. Cl. .............................. 345/82; 345/32; 345/44; 379/93.17
(58) Field of Search .................................. 345/32, 44, 48, 345/82; 379/58, 59, 61, 433, 96, 93.17; 348/51, 52, 54; 455/556, 557

(56) References Cited

U.S. PATENT DOCUMENTS

| 4,076,978 | * | 2/1978 | Brennan et al. . | |
| 4,481,382 | * | 11/1984 | Villa-Real . | |
| 4,510,525 | * | 4/1985 | Kuperman et al. | 348/52 |
| 4,722,587 | * | 2/1988 | Thorsten . | |
| 4,934,773 | * | 6/1990 | Becker . | |
| 5,023,905 | * | 6/1991 | Wells et al. | 379/96 |
| 5,048,077 | * | 9/1991 | Wells et al. | 379/433 |
| 5,224,198 | * | 6/1993 | Jachimowicz et al. . | |

FOREIGN PATENT DOCUMENTS

| 3323858 | * | 1/1985 | (DE) | 379/61 |

* cited by examiner

*Primary Examiner*—Regina Liang
(74) *Attorney, Agent, or Firm*—Eugene A. Parsons; William E. Koch

(57) ABSTRACT

A portable communications transceiver having a first hollow body, a second hollow body, and a virtual image display that includes a semiconductor array providing a real image and an optical system mounted in the second body to receive the real image and produce a virtual image at a viewing aperture. Electronics are associated with the array to produce real images in accordance with messages and graphical images received by the receiver. The display is sufficiently small enough to mount in a hand held cellular or portable telephone by the operator while using the telephone.

14 Claims, 6 Drawing Sheets

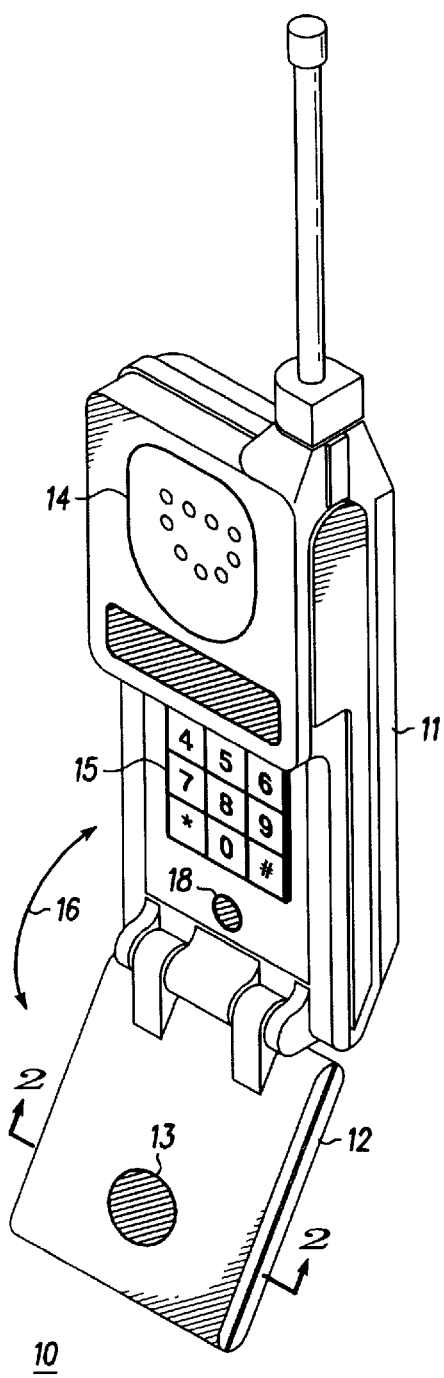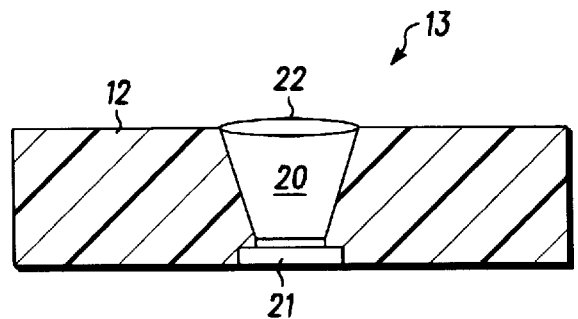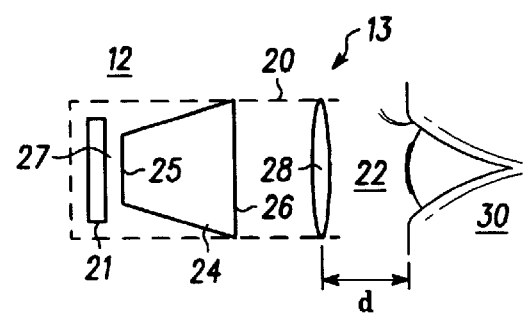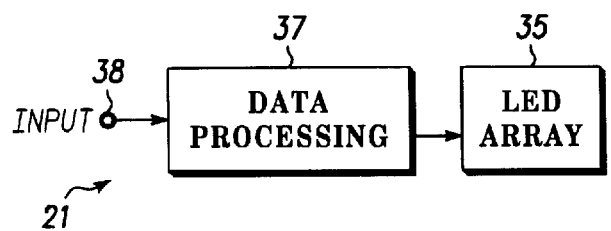

TRANSCEIVER WITH MINIATURE VIRTUAL IMAGE DISPLAY

RELATED DOCUMENTS

The present application is a continuation-in-part of a application entitled TRANSCEIVER WITH MINIATURE VIRTUAL IMAGE DISPLAY, having Ser. No. 08/130,825, and filed on Oct. 4, 1993, now abandoned and assigned to the same assignee.

FIELD OF THE INVENTION

The present invention pertains, generally, to portable communications transceivers and, more particularly, to visual displays with portable communications transceivers.

BACKGROUND OF THE INVENTION

Portable communications transceivers, such as cellular and cordless telephones, pagers and the like, are becoming increasingly popular. In many instances it is desirable to provide a visual display on the transceiver to supply the operator with a visual message or graphical image. The problem is that visual displays require relatively high electrical power and require a great amount of area to be sufficiently large to produce a useful display.

In the prior art, for example, it is common to provide visual displays utilizing liquid crystal displays, directly viewed light emitting diodes, etc. These produce very large and cumbersome displays that greatly increase the size of the transceiver and require relatively large amounts of power.

In one instance, the prior art includes a scanning mirror to produce a visual display but again this requires relatively large amounts of power and is very complicated and sensitive to shock. Also, the scanning mirror causes vibration in the unit that substantially reduces visual comfort and acceptability.

SUMMARY OF THE INVENTION

Briefly stated, a portable communications transceiver having a first hollow body, a second hollow body, a communications receiver, a transmitter, and a miniature virtual image display having a viewing aperture. The miniature virtual image display is contained in the second hollow body operably attached to the receiver and including image generation apparatus for providing a real image. A fixed optical system produces, from the real image a virtual image viewable through the viewing aperture.

It is an advantage of the present invention to provide a new and improved portable communications transceiver with miniature virtual image display.

It is a further advantage of the present invention to provide a new and improved portable communications transceiver with miniature virtual image display that substantially reduces the amount of power required.

It is a further advantage of the present invention to provide a new and improved portable communications transceiver with miniature virtual image display requiring substantially less space to provide a useful and easily viewable display.

It is a further advantage of the present invention to provide a new and improved portable communications transceiver with a miniature virtual image display to enable the operator to easily view a virtual image and simultaneously be able to carry on voice communication.

BRIEF DESCRIPTION OF THE DRAWINGS

Referring to the Drawings:

FIG. 1 is a view in perspective of a portable communications transceiver embodying the present invention;

FIG. 2 is an enlarged sectional view as seen from 2—2 in FIG. 1;

FIG. 3 is an enlarged simplified schematic view of a miniature virtual image display included in the portable communications transceiver of FIG. 1;

FIG. 4 is a simplified block diagram of electronics associated with the miniature virtual image display of FIG. 3;

DETAILED DESCRIPTION OF THE DRAWINGS

Figure 5:
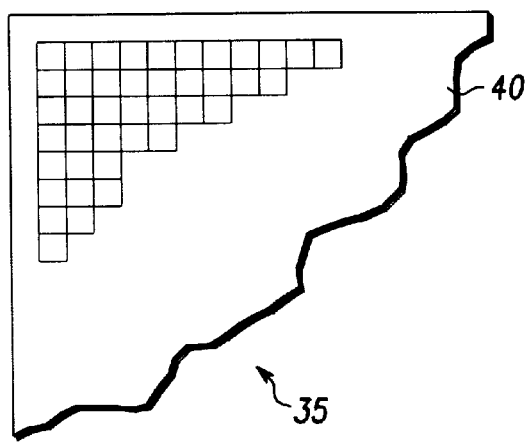
FIG. 5 is an enlarged view in top plan of an LED array, portions thereof broken away, forming a portion of the electronics of FIG. 4.

FIG. 1, illustrates a portable communications transceiver 10 having a first hollow body 11, a second hollow body 12, and a miniature virtual display 13 mounted therein First hollow body 11 and second hollow body 12 are hingably or pivotally attached so that second hollow body 12 is capable of closing on first hollow body 11, as well as having second hollow body 12 being able to be opened from the closed position to operably engage transceiver 10. It will of course be understood that portable communications transceiver 10 can be any of the well known portable receivers, such as a cellular telephone, cordless telephone, a cellular telephone with a paging capability, a pager, or the like. In the present embodiments, for purposes of explanation only, portable communications transceiver 10 is a portable cellular telephone. Portable communications transceiver 10 includes a control panel 15 for initiating calls and a standard visual display 16, if desired, for indicating the number called or the number calling. Additionally, first hollow body 11 also includes a speaker 14 for listening to an audio or a voice communication, as well as having a microphone 18 that is operably coupled to a transmitter. Typically, portable communications transceiver 10 is hand held to the head of the operator so that audio communication is heard in the ear and visual communication is seen by the eye of the operator. Moreover, speech or audio, and visual communication are capable of being carried on simultaneously with portable communications transceiver 10.

Referring to FIG. 2, a simplified sectional view through miniature virtual display 13, as seen from line 2—2, is illustrated. Miniature virtual display 13 includes image generation apparatus 21 for providing a real image to a fixed optical system 20, which in turn produces a virtual image viewable by the operator through an aperture 22 or a lens 28 as shown in FIG. 3. Fixed optical system 20 is constructed to magnify the entire real image from image generation apparatus 21, without utilizing moving parts, so that the virtual image viewable through aperture 22 is a complete frame, or picture, which appears to be very large and is easily discernible by the operator. By producing a virtual image from the very small real image of the apparatus 21, fixed optical system 20 is relatively small and adds virtually no additional space requirements to second hollow body 12 of portable communications transceiver 10, as shown in FIG. 1. Optical system 20 is constructed with no moving parts, other than optional features such as focusing, zoom lenses, etc. Further, apparatus 21 requires very little electrical power to generate the real image and, therefore, adds very little to the power requirements of portable communications transceiver 10, as shown in FIG. 1.

Referring to FIG. 3, a specific miniature virtual image display 13 is illustrated in a simplified schematic view. Miniature virtual image display 13 includes apparatus 21 for providing a real image on a surface 23. Fixed optical system 20, in this specific embodiment, includes a lens system 24 having diffractive and refractive elements. However, it should be understood by one of ordinary skill in the art that many different kinds of optical elements, such as optical fibers and bundles thereof, mirrors, lenses including refractive optical elements, diffractive optical elements, Fresnel optical elements, reflective optical elements and the like may replace or be used in conjunction with lens system 24 so as to provide a suitable virtual image with eye relief, thereby providing ease of viewing. Lens system 24 has a first surface 25 positioned adjacent the surface 23 of apparatus 21 and a second surface 26 defined at the opposite end of lens system 24. Aperture or lens 28, a part of lens system 24, is positioned in spaced relation to surface 26 of lens system 24 and, in cooperation with lens system 24, produces a virtual image viewable by an eye 30 spaced from a viewing aperture 22 generally defined by lens 28.

Apparatus 21 is illustrated in more detail in FIG. 4 and includes, for example, semiconductor electronics for generating a light emitting device array 35, such as a light emitting diode (LED) array driven by data processing circuits 37. Data processing circuits 37 include, for example, logic and switching circuit arrays for controlling each LED in light emitting device array 35. Data processing circuits 37 include, in addition to or instead of the logic and switching arrays, a microprocessor or similar circuitry for processing input signals to produce a desired real image on a device such as LED array version of light emitting device array 35.

In this specific embodiment light emitting device array 35 is an LED array that is utilized because of the extremely small size that can be achieved and because of the simplicity of construction and operation. It will of course be understood that other image generating devices may be utilized, including but not limited to lasers, field emission devices (FED), or the like.

Referring specifically to FIG. 5, a plan view of light emitting device array 35 is illustrated in which pixels are formed in a regular pattern of rows and columns on a single semiconductor chip 40. Each pixel includes at least one light emitting device, such as a LED, a laser, a FED, or the like. Additionally, parallel light emitting devices are capable of being included, if desired, for additional brightness and redundancy. By addressing specific pixels by row and column in a well known manner, the specific pixels are energized to produce a real image. Digital or analog data is received at input terminal 38 and converted by data processing circuits 37 into signals capable of energizing selected pixels to generate the predetermined real image. It should be understood by one of ordinary skill in the art that light emitting device array 35 is made of any suitable array, such as a FED array, a laser array, LED array, or the like.

It will be understood by those skilled in the art that light emitting device array 35 and semiconductor chip 40 are greatly enlarged in the FIGURES. The actual size of semiconductor chip 40 varies greatly; however, in general, semiconductor chip 40 ranges from approximately one centimeter on each side to 1.0 millimeter on each side. However, in a preferred embodiment of the present invention, size of semiconductor chip 40 ranges from 1.0 centimeter on a side to 0.1 centimeter on a side. Further, each light emitting device or pixel ranges in size approximately from 50.0 microns to 0.25 micron on a side having a preferred range from 20.0 microns to 0.5 micron with a nominal size of 10.0 microns. Further, spacing between each light emitting device or pixel ranges in size from 50.0 microns to 0.25 micron having a preferred range from 20.0 microns to 0.5 micron with a nominal size of 10.0 microns. Additionally, each light emitting device is turned ON with approximately 1.8 volts and utilizes approximately 50 microamperes ($\mu A$) of current when turned ON. With each light emitting device or pixel turned ON or when a graphical image that is a picture forms from the light emitting devices of the semiconductor chip 40, the light emitting devices produce an luminance less than approximately 15 foot Lamperts (fL) (Lumins per square foot). Further, as the semiconductor technology improves, a resulting reduction of feature size capable of being formed on the chip will take place, thus a larger quantity of information and graphical images will be able to be displayed on chip 40.

Surface 25 of lens system 24 is positioned adjacent light emitting device array 35 so as to pick up real images generated thereby and transmit the image by way of lens system 24 to surface 26. It should be noted that while FIG. 3 illustrates a space 27 between surface 23 and surface 25, space 27 does not necessarily need to be present in the instant invention. In the specific embodiment illustrated in FIGS. 2 and 3 lens system 24 is a magnification fiber optic bundle, thus lens system 24 is shown tapering along the length thereof so that the image at surface 26 is larger than the real image at surface 25. The taper in the present embodiment provides an image at surface 26 that is twice as large as the image at surface 25, which is equivalent to a power of two magnification. It will be understood by those skilled in the art that additional magnification (taper) may be included if desired. It should be further understood by those skilled in the art that lens system 24 is capable of being any combination of refractive optical elements, diffractive optical elements, reflective optical elements, Fresnel optical elements, or the like.

The lens system or aperture, represented schematically by lens 28, is mounted in spaced relation from surface 26 of lens system 24 so as to receive the image from surface 26 and magnify it an additional predetermined amount. In the present embodiment, lens 28 magnifies the image another ten times (10×) so that the real image from light emitting device array 35 is magnified a total of twenty times. It will of course be understood that the lens system may be adjustable for focus and additional magnification, if desired, or may be fixed in a housing for simplicity. Because the image received by lens 28 from lens system 24 is much larger than light emitting device array 35, the lens system does not provide the entire magnification and, therefore, is constructed larger and with less magnification. Because of this larger size, the lens system has a larger field of view and a greater working distance.

Eye relief is the distance that eye 30 can be positioned from viewing aperture 22 and still properly view the image, which distance is denoted by "d" in FIG. 3. Because of the size of lens 28, eye relief, or the distance d, is sufficient to provide comfortable viewing and in the present embodiment is great enough to allow a viewer to wear normal eyeglasses, if desired. Because the operator can wear normal corrective lenses (personal eyeglasses), focusing and other adjustable features are not required and, therefore, virtual image display 13 can be constructed very simply and inexpensively.

Figure 6:
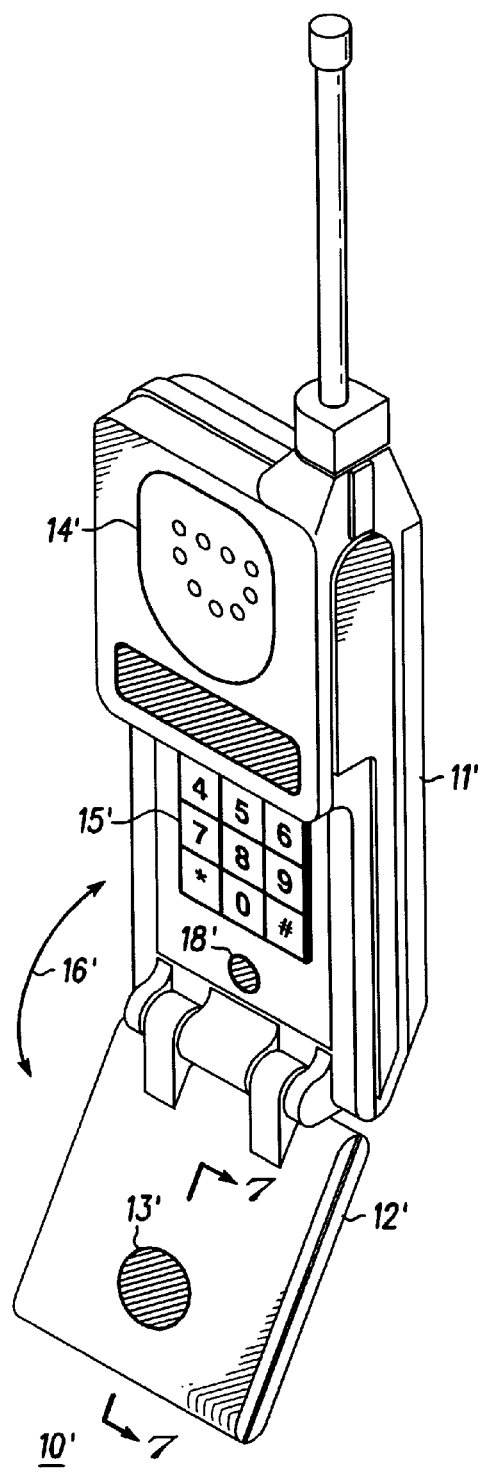
FIG. 6 is a view in perspective of a portable communications transceiver embodying another embodiment of the present invention.
Figure 7:
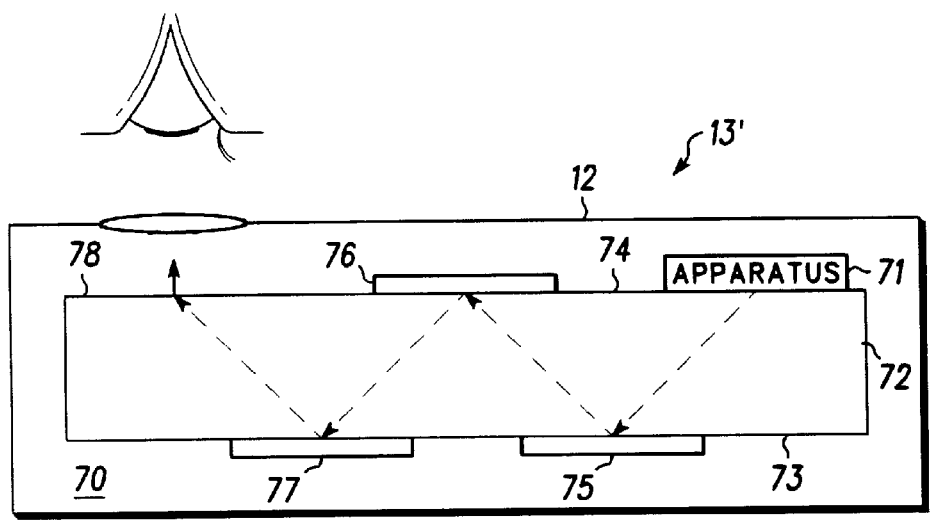
FIG. 7 is an enlarged sectional view as seen from the line 7—7 in FIG. 6.

Referring specifically to FIGS. 6 and 7, a second embodiment is illustrated wherein similar parts are designated with similar numbers with a prime added to the numbers to indicate a different embodiment. In this embodiment of the present invention, a portable communications transceiver 10' has a miniature virtual display 13' included in second hollow body 12', using virtual image display 70. Miniature virtual display 13' is basically similar to miniature virtual display 13 of FIGS. 1 and 2; however, use of virtual image display 70 enables a more flat configuration of miniature virtual display 13'.

Virtual image display 70 is illustrated in a simplified schematic view in FIG. 7. In waveguide virtual image display 70 image generation apparatus 71, similar to apparatus 21 described above, is affixed to the inlet of an optical waveguide 72 for providing a real image thereto. Light rays from the real image at apparatus 71 are directed angularly toward a predetermined area on a first side 73 where they are reflected back toward a second side 74 generally along an optical path defined by sides 73 and 74. Three diffractive lenses 75, 76 and 77 are affixed to sides 73 and 74 at the next three predetermined areas, respectively, to which the reflected light rays are directed. Diffractive lenses 75, 76, and 77 provide the required amount of magnification, aberration correction and/or filtering so that a virtual image of a desired size is viewable at an aperture 78 defined by the outlet of optical waveguide 72.

Figure 8:
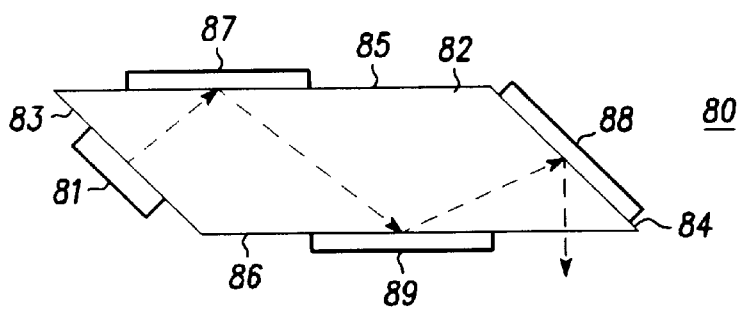
FIGS. 8 and 9 are additional simplified schematic views, similar to FIG. 7, of other miniature virtual image displays usable in portable communication transceivers.

Referring to FIG. 8, another specific miniature virtual image display 80 is illustrated in a simplified schematic. In waveguide virtual image display 80, image generation apparatus 81, similar to apparatus 21 described above, is affixed to the inlet of an optical waveguide 82 for providing a real image thereto. Waveguide 82 is formed generally in the shape of a parallelogram (side view) with opposite sides, 83, 84 and 85, 86, equal and parallel but not perpendicular to adjacent sides. Side 83 defines the inlet and directs light rays from the real image at apparatus 81 onto a predetermined area on adjacent side 85 generally along an optical path defined by all four sides. Three diffractive lenses 87, 88 and 89 are positioned along adjacent sides 85, 84 and 86, respectively, at three predetermined areas to provide the magnification, aberration correction and/or filtering to the virtual image that is viewable at an outlet in side 86. This particular embodiment illustrates a display in which the overall size is reduced somewhat and the amount of material in the waveguide is reduced to reduce weight and material utilized.

Figure 9:
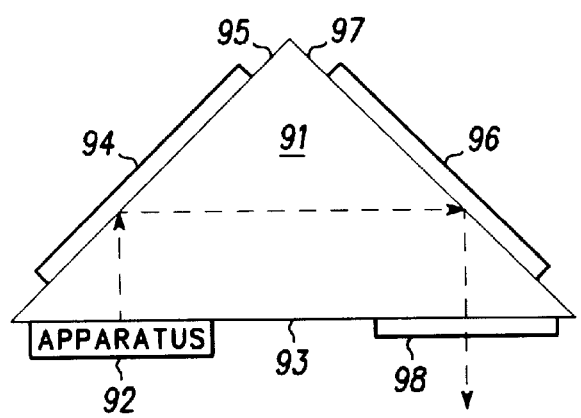

Referring to FIG. 9, another specific miniature virtual image display 90 is illustrated in a simplified schematic. In waveguide virtual image display 90 an optical waveguide 91 having a generally triangular shape in side elevation is utilized. Image generation apparatus 92, similar to apparatus 21 described above, for producing a real image is affixed to a first side 93 of optical waveguide 91 and emanates light rays that travel along an optical path directly to a diffractive lens 94 affixed to a second side 95. Light rays are reflected from lens 94 to a diffractive lens 96 mounted on a third side 97. Lens 96 in turn reflects the light rays through a final diffractive lens 98 affixed to the outlet of optical waveguide 91 in side 93, which lens 98 defines a viewing aperture for display 90. In this particular embodiment the sides of display 90 are angularly positioned relative to each other so that light rays enter and leave the inlet and outlet, respectively, perpendicular thereto.

Miniature virtual image display 13, described above, is described in more detail in a copending application entitled "COMPACT VIRTUAL IMAGE DISPLAY", filed on Sep. 30, 1991, bearing Ser. No., 07/767,179, and assigned to the same assignee. Also, miniature virtual image displays 70, 80 and 90, along with other miniature virtual image displays that can be utilized in conjunction with the present invention, are described in more detail is found in patent entitled "WAVEGUIDE VIRTUAL IMAGE DISPLAY", filed on Sep. 30, 1991, bearing Ser. No. 07/767/180, issued on Jun. 6, 1993, with U.S. Pat. No. 5,224,198 and assigned to the same assignee.

Figure 10:
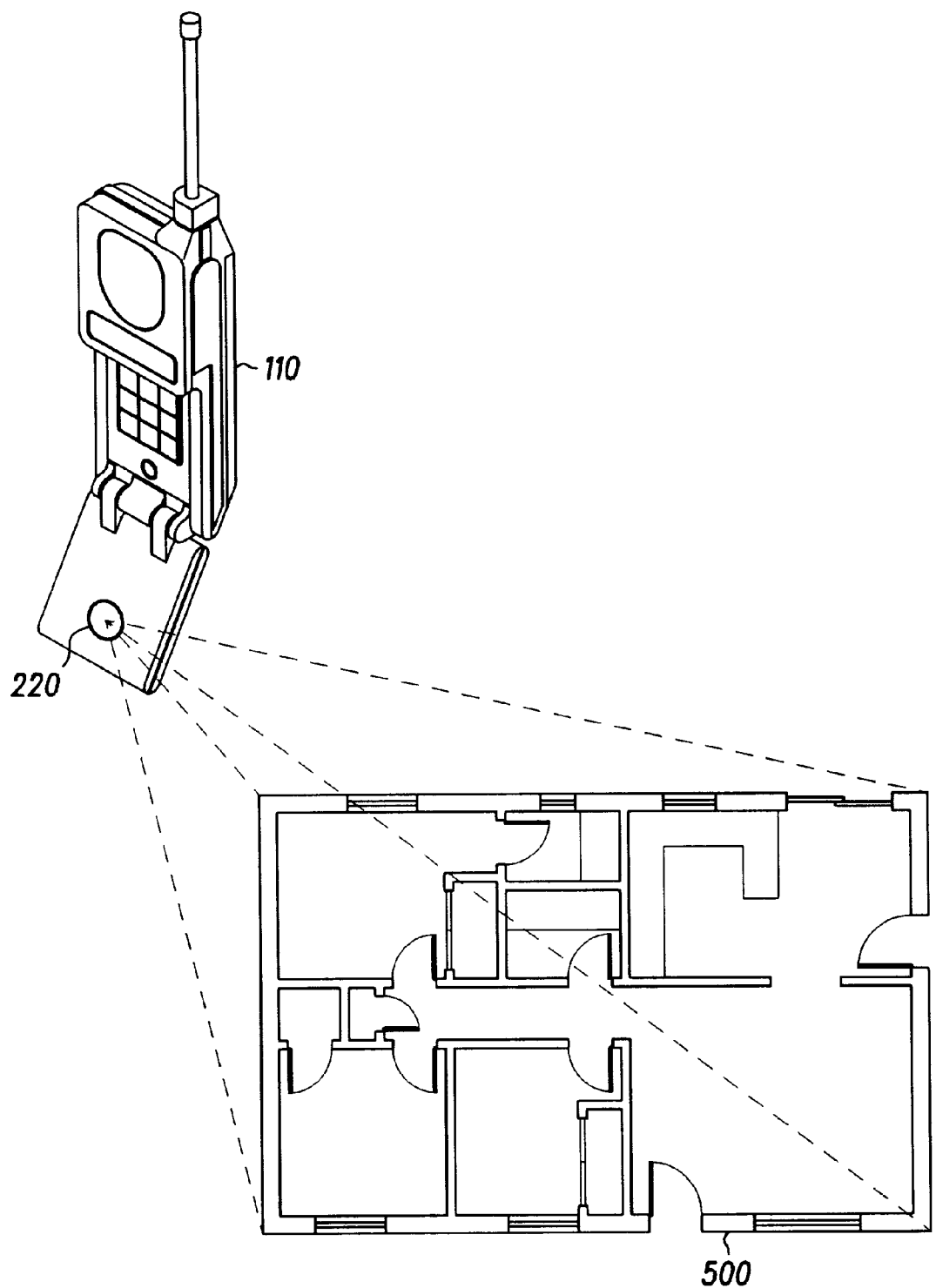
FIG. 10 is a view in perspective illustrating a typical view as seen by the operator of the portable communications receiver of FIG. 1.

FIG. 10 is a perspective view of hand held transceiver 10 of FIG. 1 illustrating a typical view 500 seen by an operator looking into viewing aperture 22 of miniature virtual image display 13 or 13'. View 500 could be, for example, a business FAX that requires an immediate decision. In yet another example, medical charts could be Faxed or electronically sent to portable transceiver 10, 10' and can be perceived and discussed simultaneously. Similarly, miniature virtual image display 13 or 13' might be utilized to transmit pictures of missing persons or wanted criminals, maps, extremely long messages, etc. Many other variations, such as silent receiver operation wherein the message appears on miniature virtual image display 13 or 13' instead of audibly, are possible. Moreover, these images are capable of being down loaded into a computer subsequently by well-known methods in the art, thus not allowing the information to be lost.

Figure 11:
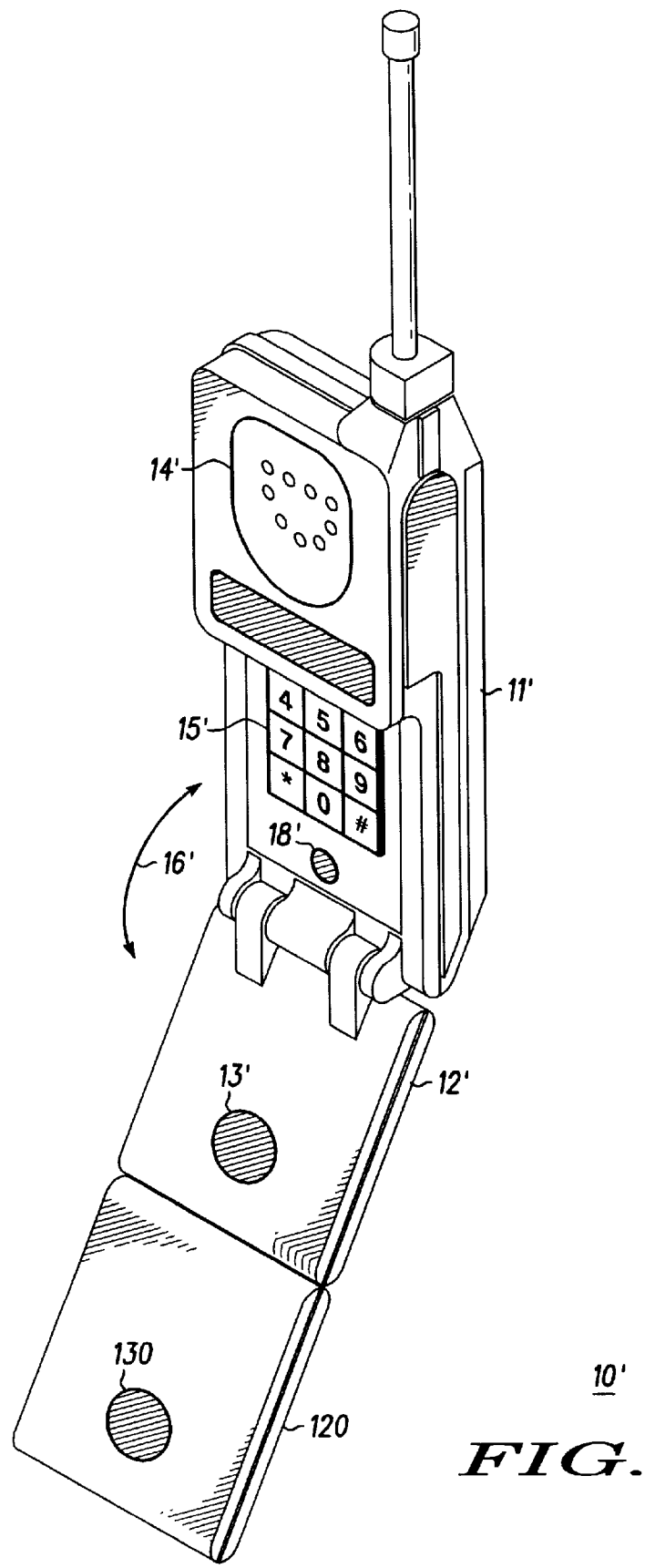
FIG. 11 is a view in perspective of a portable communication transceiver embodying yet another embodiment of the present invention.

Referring specifically to FIG. 11, another embodiment of the present invention is illustrated, wherein similar or identical features as illustrated in FIG. 1 have retained their identifying numerals. As shown in FIG. 11, a third hollow body 120 having miniature virtual image display 130 is pivotally or hingably affixed to second hollow body 12, thus enabling two miniature virtual image displays 13 and 130 to be used by the operator. By using two miniature virtual image displays 13 and 130, the operator is capable of viewing a binocular image that is a stereoscopic or a 3-D image. Miniature virtual image displays 13 and 130 are made as disclosed hereinabove. It should be understood by those skilled in the art that third hollow body 120 is capable of being incorporated into second hollow body 12 so that hollow body 12 has two miniature virtual image displays.

It should be noted that in the prior art, pagers and other small receivers and small transceiver in which visual displays are desired are especially handicapped by the size of the displays. Generally such displays are limited to a single short line of text, and the size of the display still dictates the size of the receiver. Utilizing an embodiment of the present invention, a display with several lines of text or graphical images can be incorporated and the size of the receiver can be substantially reduced. Further, the display is clearer and easier to read.

Figure 12:
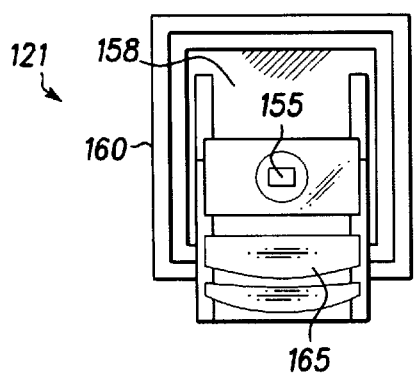
FIG. 12 is a plan view of another embodiment of miniature virtual display system.
Figure 13:
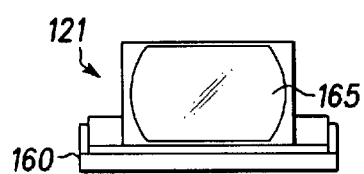
FIG. 13 is a sectional view taken through 13—13 of the another embodiment of miniature virtual display system.
Figure 14:
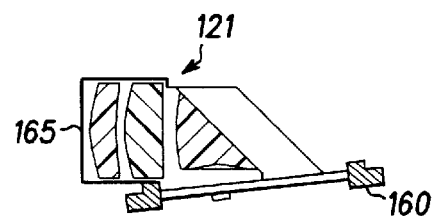
FIG. 14 is a sectional view taken through 14—14 of the another embodiment of miniature virtual display system.

Referring now to FIGS. 12, 13, and 14, FIGS. 12, 13, and 14 illustrate actual size and relative sizes of surrounding elements and features of a miniature virtual display system 121. More specifically, FIG. 12 is a simplified plan view of another embodiment of a miniature virtual display system 121 in accordance to the present invention. Miniature virtual display system 121 illustrates several main features or elements, such as light emitting semiconductor chip 155 having an array of light emitting devices, interconnect board 160, and an optical system 165. Light emitting semiconductor chip 155, as illustrated, is a semiconductor chip having a plurality of light emitting devices arranged in a plurality of rows and a plurality of columns as shown in FIG. 5, in part. When in use, the plurality of light emitting devices are organizationally activated in which some of the plurality of light emitting devices emit light to form a complete graphical picture on the light emitting semiconductor chip 155. Additionally, in the present invention, the number of pixels contained in the array is greater than or equal to the number of pixels in the image to be displayed. Thus, an entire complete real image of a graphical picture is formed by the plurality of light emitting devices on semiconductor chip 155, thereby forming the real image prior to interaction with any optical elements.

Light emitting semiconductor chip 155 having an array of light emitting devices is mounted on the under-surface of glass substrate 158 and driver board 160 is bump-bounded to substrate 159. Optical system 165 is also mounted on substrate 158 and magnifies the image approximately 20× to produce a virtual image approximately the size of an 8.5× 11.0 inch sheet of paper.

Here it should be noted that because of the very small size of light emitting semiconductor chip 155 and the fact that a virtual image is utilized, rather than a direct view display, the overall physical dimensions of miniature virtual image display 150 are approximately 1.5 inches (3.8 cm) wide by 0.75 inches (1.8 cm) high by 1.75 inches (4.6 cm) deep, or a total volume of approximately 2 cubic inches (32 cm3).

FIG. 13 shows a frontal view of miniature virtual image display 150. FIG. 13 illustrates positioning of substrate 158, driver board 160 and optical system 165.

FIG. 14 is a side view of miniature virtual image display 150. FIG. 14 illustrates positioning of diver board 160 and optical system 165.

Figure 15:
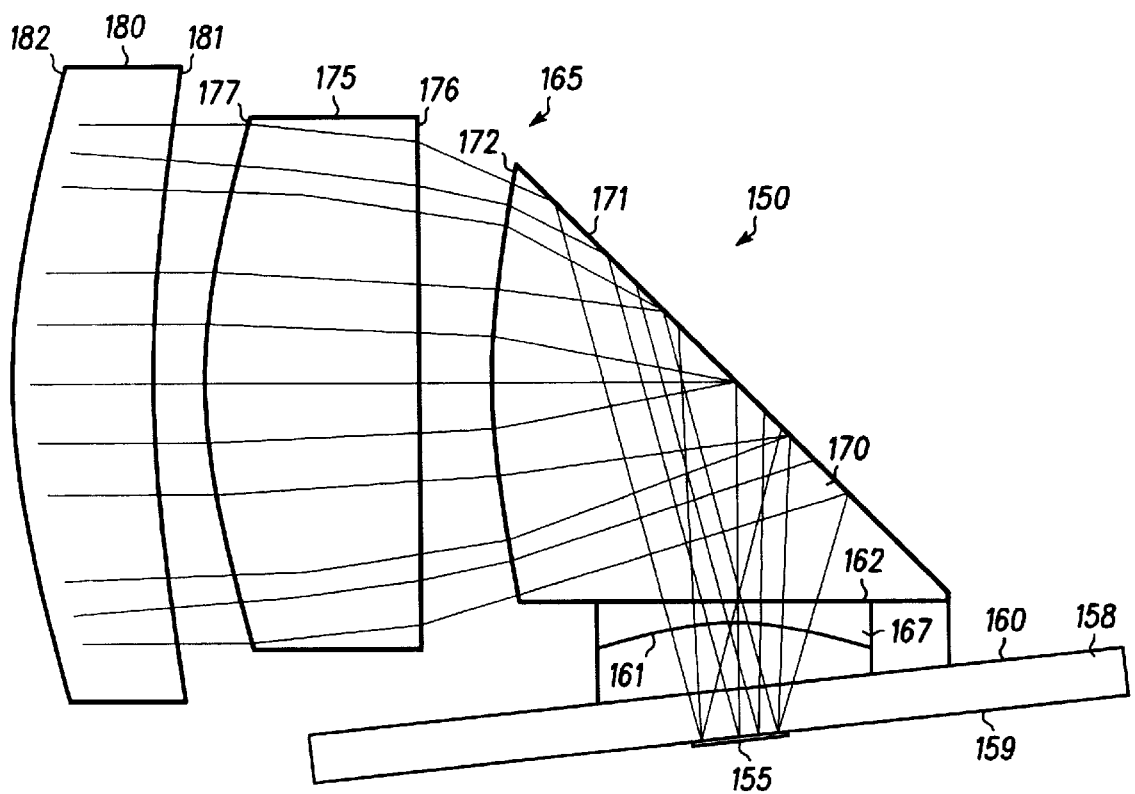
FIG. 15 is a simplified enlarged sectional view of the another embodiment of miniature virtual display system.

Referring specifically to FIG. 15, a simplified 4×magnified view in side elevation of miniature virtual image display 150 of FIG. 14 is illustrated for clarity. Generally, miniature virtual image display is made of several main elements or features such as, semiconductor chip 155 having an array, substrate 158 having surfaces 159 and 160, an optical lens 167 having a concave surface 161 and flat surface 162, an optical prism 170 having surfaces 171, 172, and 173. Additionally, lenses 175 and 180 having surfaces 176 and 177, and surfaces 181 and 182, respectively, can be used. Further, an optical element 174 is sometimes applied to surface 171 of optic prism 170 to enhance optical characteristics of surface 171.

From this view it can be seen that a first optical lens 167 is affixed directly to surface 160 of substrate 158. An optical prism 170 is mounted to reflect the image from a surface 171 and from there through a refractive surface or surface 172. The image is then directed to an optical lens 175 having a refractive inlet or surface 176 and a refractive outlet surface 177. From lens 175 the image is directed to an optical lens 180 having an inlet refractive surface or surface 181 and an outlet refractive surface or surface 182. Also, in this embodiment, at least one diffractive optical element is provided on one of the surfaces, e.g. surface 171 and/or surface 176, to correct for aberration and the like. The operator looks into surface 182 of lens 180 and sees a large, easily discernible virtual image which appears to be behind display 150 (as previously described).

It should be noted that in the prior art, pagers and other small receivers in which visual displays are desired are especially handicapped by the size of the displays. Generally such displays are limited to a single short line of text, and the size of the display still dictates the size of the receiver. Utilizing an embodiment of the present invention, a display with several lines of text can be incorporated and the size of the receiver or other portable electronic equipment can be substantially reduced. Further, the display is clearer and easier to read and, because it utilizes a virtual display, requires very little power for the operation thereof. In fact, the present display uses much less power than any of the direct view displays normally utilized in electronic equipment and, as a result, can be fabricated in much smaller sizes.

Thus, a greatly improved portable communications transceiver having a miniature virtual image display is disclosed, which incorporates an extremely small virtual image display, that uses a real image formed on a semiconductor chip device. Because a virtual image display is utilized, the display is constructed very small and requires very little power. Further, because of the extremely small size and power consumption of the virtual image display, it is incorporated into a portable transceiver such as a cellular telephone without substantially effecting the size or power requirements. The miniature virtual display provides a predetermined amount of magnification along with sufficient eye relief and lens working distance to create a comfortable and viewable virtual image. Also, a complete virtual image is produced with no moving parts or power consuming motors and the like. Further, the electronics provided as a portion of the miniature virtual image display allows a variety of very small real images to be generated, which can be easily and comfortably viewed by an operator. The very small real image is magnified into a large virtual image that is easily perceived by the operator.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A portable transceiver device with a virtual image display comprising:
 a portable transceiver device having a first hollow body and a second hollow body pivotally attached to the first hollow body, the first hollow body including a portable transmitter and a portable receiver, and a miniature virtual image display having a viewing aperture contained in the second hollow body, the miniature virtual image display being operably attached to the portable receiver and including an image generation apparatus that provides a complete real image producing less than 15 fL and a fixed optical system for producing, from the complete real image, a virtual image viewable through the viewing aperture.

2. A portable transceiver device with a virtual image display as claimed in claim 1 wherein the image generation apparatus includes an array of semiconductor devices defining a plurality of pixels arranged in rows and columns and image forming electronics connected to the plurality of pixels and to the portable receiver, the array of semiconductor devices forming the complete real image in accordance with signals received from the portable receiver.

3. A portable transceiver device with a virtual image display as claimed in claim 2 wherein the array of semiconductor devices is formed from light emitting diodes.

4. A portable transceiver device with a virtual image display as claimed in claim 2 wherein the complete real image is a graphical picture, wherein a number of pixels contained in the array is greater than or equal to a number of pixels in an image to be displayed.

5. A portable transceiver device with a virtual image display as claimed in claim 2 wherein the array of semiconductor devices is formed from lasers.

6. A portable transceiver device with a virtual image display as claimed in claim 5 wherein the lasers are vertical cavity surface emitting lasers.

7. A portable transceiver device with a virtual image display as claimed in claim 1 wherein the first hollow body and the second hollow body are hingably affixed.

8. A portable transceiver device with a virtual image display comprising:
- a first hollow body being hingably affixed to a second hollow body;
- a portable transmitter and a portable receiver, wherein the portable transmitter and the portable receiver are contained in the first hollow body; and
- a miniature virtual image display having a viewing aperture, the miniature virtual image display being operably attached to the portable receiver and including an image generation apparatus of semiconductor devices that define an array of pixels arranged in rows and columns producing less than 15 fL as a whole for providing a complete real image and a fixed optical system for producing, from the complete real image, a virtual image viewable through the viewing aperture wherein the miniature virtual image display is contained in the second hollow body.

9. A portable transceiver device with a virtual image display as claimed in claim 8 wherein the image generation apparatus is an array of semiconductor devices that define an array of pixels, the semiconductor devices producing the complete real image, the semiconductor devices being contained in the second hollow body.

10. A portable transceiver device with a virtual image display as claimed in claim 8 further comprising a second miniature virtual image display having a second viewing aperture, the second miniature virtual image display being operably attached to the portable receiver and including a second image generation apparatus of semiconductor devices that define an array of pixels arranged in rows and columns producing less than 15 fL as a whole for providing a second complete real image and a second fixed optical system for producing a second complete real image located in the second hollow body.

11. A portable transceiver device with a virtual image display as claimed in claim 8 wherein the semiconductor devices producing the complete real image are located in the second hollow body.

12. A portable transceiver device with a 3-D virtual image display comprising:
- a first hollow body, a second hollow body, and a third hollow body, wherein the second hollow body is hingably affixed to the first hollow body, and wherein the third hollow body is hingably affixed to the second hollow body;
- a portable transmitter and a portable receiver, wherein the portable transmitter and the portable receiver are contained in the first hollow body; and
- a first miniature virtual display having first viewing aperture and a second miniature virtual image display having a second viewing aperture, the first miniature virtual image display and the second miniature virtual image display both being operably attached to the portable receiver with each of the first and the second miniature virtual displays including image generation apparatus that provides a complete real image and a fixed optical system for producing, from the complete real image, a virtual image viewable through the viewing aperture, wherein the first miniature virtual image display is contained in the second hollow body, and wherein the second miniature virtual image display is contained in the third hollow body.

13. A portable transceiver device with a virtual image display comprising:
- a first hollow body hingably affixed to a second hollow body;
- a portable transmitter and a portable receiver, wherein the portable transmitter and the portable receiver are contained in the first hollow body; and
- a miniature virtual image display having a viewing aperture, the miniature virtual image display being operably attached to the portable receiver and including an image generation apparatus of semiconductor devices that define an array of pixels with individual pixels having a size ranging from 20.0 to 0.5 microns arranged in rows and columns, that provides a complete real image having a luminance of less than 15 fL and a fixed optical system for producing, from the complete real image, a virtual image viewable through the viewing aperture wherein the miniature virtual image display is contained in the second hollow body.

14. A portable transceiver device with a virtual image display comprising:
- a portable transceiver device having a first hollow body and a second hollow body pivotally attached to the first hollow body, the first hollow body including a portable transmitter and a portable receiver, and a miniature virtual image display having a viewing aperture contained in the second hollow body, the miniature virtual image display being operably attached to the portable receiver and including an image generation apparatus, the image generation apparatus having a semiconductor chip with an array and a fixed optical system, the array provides a complete graphical picture that produces less than 15 fL and forms the complete graphical picture on the array prior to interaction with the fixed optical system for producing, from the complete graphical picture, a virtual image of the complete graphical picture viewable through the viewing aperture.

* * * * *